UNITED STATES PATENT OFFICE.

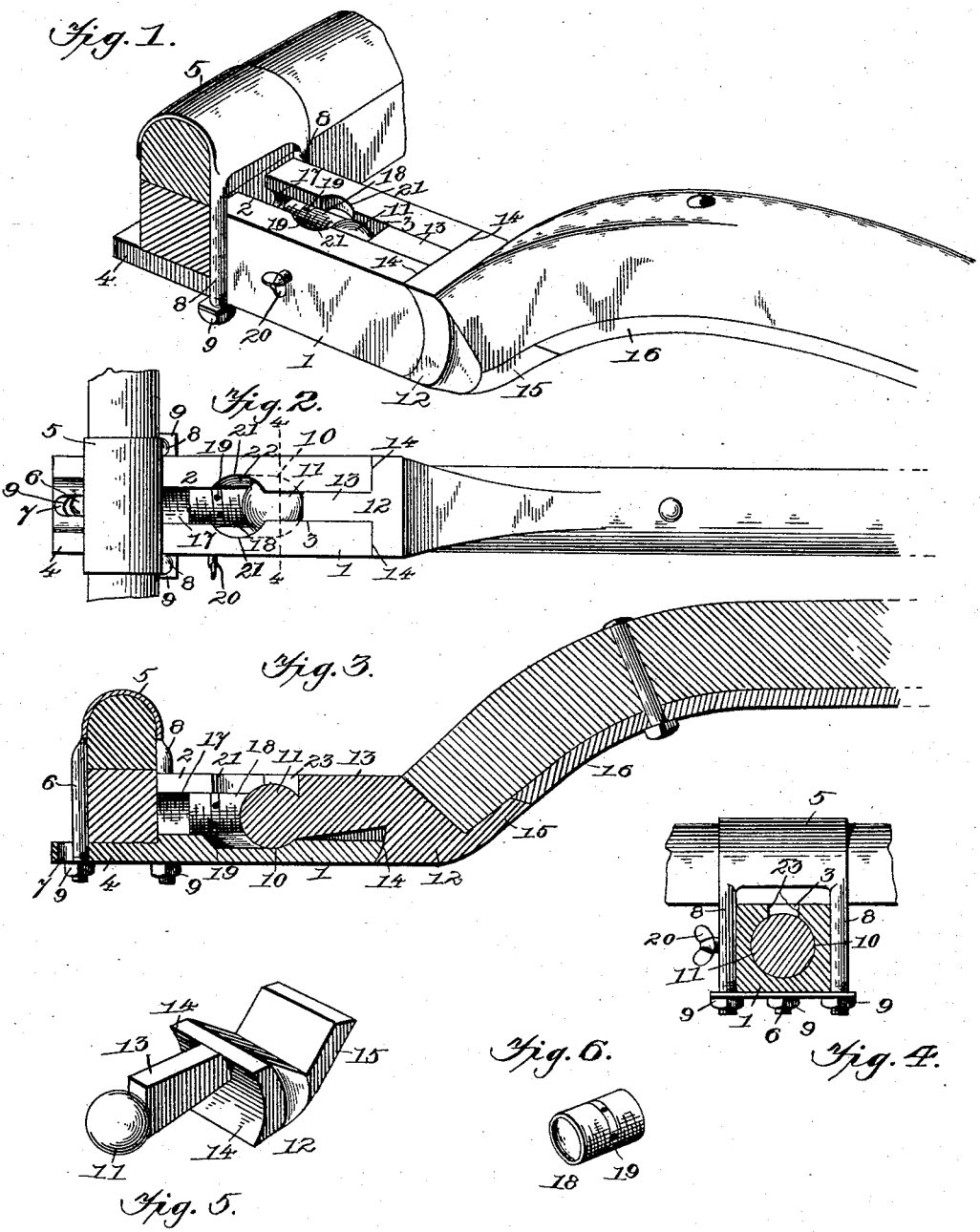

GEORGE CRANE THOMPSON AND THOMAS CLAY EDWARDS, OF SALINAS, CALIFORNIA.

THILL-COUPLING.

SPECIFICATION forming part of Letters Patent No. 572,734, dated December 8, 1896.

Application filed June 13, 1896. Serial No. 595,439. (No model.)

*To all whom it may concern:*

Be it known that we, GEORGE CRANE THOMPSON and THOMAS CLAY EDWARDS, citizens of the United States, residing at Salinas, in the county of Monterey and State of California, have invented a new and useful Coupling, of which the following is a specification.

This invention relates to new and useful improvements in couplings especially adapted for attaching thills and poles to vehicles; and it has for its object to provide a device of this character which shall be simple and embody in its construction means for compensating for any wear, thereby effectually preventing rattling of the various parts.

The invention further aims to provide a coupling which shall be both strong and durable and by which the operation of coupling and uncoupling shall be accomplished with great rapidity.

To this end the invention consists, substantially, in the construction, combination, and arrangement of parts, as will be hereinafter fully illustrated, described, and claimed.

In the accompanying drawings, Figure 1 is a perspective view of a coupling constructed in accordance with the present invention. Fig. 2 is a top plan view thereof. Fig. 3 is a longitudinal sectional view of the same. Fig. 4 is a transverse sectional view on the line 4 4, Fig. 2. Fig. 5 is a detail perspective view of the coupling member. Fig. 6 is a similar view of the retaining-bolt.

Similar numerals of reference indicate corresponding parts throughout the figures.

Referring to the drawings, 1 designates a bearing-block which may be formed of any suitable material and has its center cut out to provide a longitudinal channel 2, one end of said channel being contracted into a guide 3 for a purpose to be hereinafter stated.

One end of the block 1 has an extension 4, adapted to bear against the under side of a vehicle-axle, and for securing the coupling to such axle the usual clip 5 is employed. The clip 5 has one of its ends 6 passing through an elongated slot 7, formed in the extension 4, and the other end of said clip is provided with opposite bolts 8, which straddle the bearing-block 1 at the front of the axle, nuts 9 being mounted on the threaded ends of the clip and firmly holding the coupling to the axle.

The inner end of the guide 3 is formed into a substantially semispherical bearing 10, and disposed within said bearing 10 is the ball-shaped head 11 of a coupling member 12. The latter has a neck 13, upon the end of which the ball-shaped head 11 is formed, and said neck, when the head 11 is within the bearing 10, lies within the guide 3, thereby preventing any lateral movement of the coupling member.

It will be noted that the coupling member 12, at either side of the neck 13, is provided with shoulders 14, which are concaved slightly to conform with the adjacent convexed end of the bearing-block 1. By this construction the shoulders 14 of the coupling member will readily pass over the convexed end of the bearing-block 1 after the head 11 has been placed in the bearing 10, and said shoulders will bear against said convexed end when the coupling member is in its normally-closed position, thus forming a tight joint with the same and, together with the contracted guide 3, prevent any rattling of said coupling member. Extending outwardly from the shoulders 14 is a tongue 15, which is welded to an ordinary strap 16, secured in any suitable manner to the thill or pole of the vehicle, and the end of such thill or pole rests against the shoulders 14, which form a firm seat for the same.

The rear end of the longitudinal channel 2 is provided with screw-threads 17 for receiving a retaining-bolt 18, the latter being provided with threads, which engage with the threads 17 and hold said bolt 18 therein. The end of the bolt 18, adjacent to the head 11, is concaved, so as to correspond with the shape of the head 11, and the concaved end is adapted to bear against said head 11 when the latter is placed in the bearing 10, thereby retaining the head in said bearing, but permitting the coupling member 12 to have the required vertical play necessary to a free movement of the thills or pole. Formed in the sides of the bolt 18 is a series of openings 19, adapted to receive a suitable implement by which the bolt is rotated, so that the concaved end of said bolt 18 may either be moved toward or away from the head 11, and mounted in the side of the block 1 is a set-screw 20, the inner end of which bears against the bolt 18 when the latter has been moved into a position so as to contact with the head 11, thereby retaining said bolt in such position and overcoming any tendency of the same to rotate.

Each side of the channel 2, at the top of the block 1 and out of alinement with the bearing 10, is provided with segmental notches 21, which form a substantially circular entrance-opening 22, through which the head 11 is passed when being placed in the bearing 10. By reason of forming the bearing 10 at the inner end of the guide 3 the upper sides of the channel 2 form overhanging flanges 23, which, together with the concaved end of the bolt 18, prevent the head 11 being displaced from the bearing 10.

The operation and advantages of the herein-described coupling will be apparent to those skilled in the art.

In attaching the thills or pole to a vehicle the head 11 is passed through the entrance-opening 22 and slid into the bearing 10. The retaining-bolt 18 is then rotated until the concaved end thereof bears against the head 11, when the set-screw 20 is operated so as to bind against the side of the bolt 18 and prevent rotation of the same. This will securely hold the head 11 within the bearing 10, but will permit the coupling member to be swung vertically, and after the head 11 has been so connected, when the coupling member has been lowered, the neck 13 enters the guide 3 and prevents all lateral movement of said member. To detach the thills or pole, it is simply necessary to loosen the set-screw 20 and rotate the retaining-bolt 18 in order that its concaved end may recede from the head 11. The head 11 may then be withdrawn through the opening 22 and the thills or pole removed from the vehicle.

From the foregoing it will be apparent that we have provided a coupling which is simple in construction and one also possessing advantages in durability and strength. It is further obvious that any wear may be easily compensated for, thereby preventing rattling of the various parts and enabling the thills or pole to be quickly coupled or uncoupled; and while we have described the device as employed for thills and poles it is to be understood that the same may be used for well-boring rods, pump-rods, braces and bits, pitman-rods, and for many other purposes where a quick coupling is desired.

Having thus described the invention, what is claimed as new, and desired to be secured by Letters Patent, is—

1. A coupling of the class described, comprising a bearing-block having a convex outer end and provided with a longitudinal channel forming a front guide-slot and enlarged intermediate of its ends to form a bearing-socket and having opposite notches forming an entrance to the same, a coupling member comprising an iron or strap, provided with concave shoulders bearing against the convex end of the bearing-block, a longitudinally-disposed neck rigid with the strap or iron and arranged in the guide-slot, and a ball rigid with the neck and arranged in the bearing-socket, and means for retaining the ball in the bearing-socket, substantially as described.

2. A coupling of the class described, comprising a bearing-block having a convex outer end and provided with a longitudinal channel, forming a front guide-slot, enlarged intermediate of its ends to form a bearing-socket and having its inner end threaded, a coupling member composed of an iron or strap having concave shoulders to fit against the convex end of the bearing-block, a longitudinal neck rigid with the iron or strap and arranged in the guide-slot, and a ball rigid with the neck and arranged in the bearing-socket of the block, a longitudinally-disposed screw mounted in the threaded portion of the channel and engaging the ball to retain the same in the bearing-socket, and a clamping-screw mounted on the bearing-block and engaging the longitudinal screw, substantially as described.

In testimony that we claim the foregoing as our own we have hereto affixed our signatures in the presence of two witnesses.

GEORGE CRANE THOMPSON.
  THOMAS CLAY EDWARDS.

Witnesses:
  G. B. LEMON,
  JOHN ARCHER, Jr.